United States Patent [19]

Shiokawa et al.

[11] Patent Number: 5,149,200
[45] Date of Patent: Sep. 22, 1992

[54] TEMPERATURE MEASURING PROBE AND ELECTRONIC CLINICAL THERMOMETER EQUIPPED WITH SAME

[75] Inventors: Masahiro Shiokawa; Makoto Ikeda; Kiyoshi Sohma, all of Kanagawa; Masami Iriki, Koufu; Kinji Uchino, Yokohama; Yoshikatsu Kawashima, Yokosuka; Masahiro Kusakabe, Yokohama, all of Japan

[73] Assignee: Terumo Kabushiki Kaisha, Tokyo, Japan

[21] Appl. No.: 753,883

[22] Filed: Sep. 3, 1991

Related U.S. Application Data

[62] Division of Ser. No. 396,540, Aug. 21, 1989.

[30] Foreign Application Priority Data

Aug. 25, 1988 [JP] Japan ................. 63-209457

[51] Int. Cl.⁵ ............... G01K 7/22; G01K 7/18; H01C 1/01; H01C 1/02
[52] U.S. Cl. .................... 374/185; 374/172; 338/28; 338/237; 338/22 R
[58] Field of Search .......... 374/185, 172, 208, 183; 338/28, 29, 30, 237, 252, 22 R

[56] References Cited

U.S. PATENT DOCUMENTS

| | | | |
|---|---|---|---|
| 3,052,124 | 9/1962 | Averitt | 374/172 |
| 3,603,150 | 9/1971 | Kurtin | 374/185 |
| 4,300,392 | 11/1981 | Bloomer et al. | 374/172 |
| 4,317,367 | 3/1982 | Schonberger | 374/185 |
| 4,479,026 | 10/1984 | Brixy et al. | 374/185 |
| 4,516,865 | 5/1985 | Hideo | 374/185 |
| 4,560,973 | 12/1985 | Grimm et al. | 374/185 |
| 4,729,672 | 3/1988 | Takagi | 374/208 |
| 4,743,121 | 5/1988 | Takagi et al. | 374/208 |

FOREIGN PATENT DOCUMENTS

| | | |
|---|---|---|
| 533540 | 5/1958 | Belgium . |
| 0180951 | 5/1986 | European Pat. Off. . |
| 2455588 | 5/1976 | Fed. Rep. of Germany . |
| 3126931 | 2/1983 | Fed. Rep. of Germany . |
| 0157826 | 12/1971 | Japan . |
| 50-98778 | 8/1975 | Japan . |
| 0007229 | 1/1984 | Japan . |
| 60-179935 | 11/1985 | Japan . |
| 61-42437 | 3/1986 | Japan . |
| 0047526 | 3/1986 | Japan . |
| 0117425 | 6/1986 | Japan . |
| 0120031 | 6/1986 | Japan . |
| 0144536 | 7/1986 | Japan . |
| 1386455 | 3/1975 | United Kingdom . |
| 2085595 | 4/1982 | United Kingdom . |
| 2144226 | 2/1985 | United Kingdom . |

*Primary Examiner*—William A. Cuchlinski, Jr.
*Assistant Examiner*—Diego F. F. Gutierrez
*Attorney, Agent, or Firm*—Frishauf, Holtz, Goodman & Woodward

[57] ABSTRACT

A temperature measuring probe includes a temperature measuring circuit having a temperature sensing body supported by a flat, flexible strip-shaped base member, in which the temperature measuring circuit is sealed by a coating member, such as a film, and/or a filler, one end thereof being treated to form a connector. This structure allows the overall probe to be formed into a film-, sheet-, or plate-like configuration. Preferably, a core member is provided to the base member and coating member, with the flexibility and rigidity of the overall probe being decided by selecting the thickness, material and cross-sectional configuration of the core. The core includes at least one cavity. The thickness of the core member at a portion of the at least one cavity being approximately the same as that of the temperature sensing body. The core member has a smoothly diminishing thickness from the at least one cavity toward the rearward end of the probe.

6 Claims, 9 Drawing Sheets

TEMPERATURE MEASURING PROBE AND ELECTRONIC CLINICAL THERMOMETER EQUIPPED WITH SAME

This is a division of application Ser. No. 07/396,540 filed Aug. 21, 1989.

BACKGROUND OF THE INVENTION

This invention relates to a temperature measuring probe and an electronic clinical thermometer equipped with the probe. More particularly, the invention relates to a temperature measuring probe separable from a main body which includes a signal processor, and the electronic clinical thermometer equipped with this probe.

In a conventional electronic clinical thermometer, a main body which includes a signal processor is unitary with a probe. The overall thermometer is rigid and the probe portion thereof is rod shaped. For this reason, the temperature sensing portion has a large thermal capacity, so that it is difficult to shorten temperature measurement time.

In addition, when an electronic clinical thermometer of this conventional type is inserted in an armpit, clothing can become an impediment to measurement. When the thermometer is placed in the mouth, it causes discomfort under the tongue.

When a conventional electronic clinical thermometer is of the type used for measuring body temperature orally or anally, a troublesome sterilization operation or the like is required owing to the risk of infection. As a result, the popularity of such thermometers is reduced for reasons of hygiene and cleanliness.

SUMMARY OF THE INVENTION

Accordingly, an object of the present invention is to provide a novel, disposable temperature measuring probe, and an electronic clinical thermometer having the probe, in which the temperature sensing portion has excellent thermal response and the probe is easy to handle when measuring various parts of the body.

In order to attain the foregoing object, the temperature measuring probe of the invention includes a temperature measuring circuit supported by a flat, flexible, strip-shaped base member, in which the temperature measuring circuit is sealed by a coating member, such as a film, and/or a filler, one end thereof being treated to form a connector.

In a preferred embodiment, the temperature measuring circuit includes a temperature sensing body and a conductor for leading an electric signal from the temperature sensing body to the exterior of the temperature measuring circuit.

In a preferred embodiment, the temperature measuring circuit includes a temperature sensing body, a precision compensating resistor or a linearizing resistor for the temperature sensing body, and a conductor for leading electric signals from these elements to the exterior of the temperature measuring circuit.

In a preferred embodiment, the temperature sensing body is a thermister or a thin-film body made of platinum or the like.

In a preferred embodiment, the precision compensating resistor or linearizing resistor is a thin-film resistor.

In a preferred embodiment, the temperature sensing body is sealed by a filler having excellent thermal conductivity and is exposed from the coating member.

In a preferred embodiment, a core member is provided between the base member and the coating member.

In a preferred embodiment, the core member has a thickness approximately the same as those of circuit elements of the temperature measuring circuit and is formed to include cavities for receiving the circuit elements In a preferred embodiment, the core member has one or more polygonal or circular cavities at portions other than those corresponding to the circuit elements.

In a preferred embodiment, the core member resides only at a peripheral portion of the temperature sensing body and has a smoothly diminishing thickness.

In a preferred embodiment, at least the cavity for the temperature sensing body is filled with a filler having excellent thermal conductivity.

In a preferred embodiment, an adhesive portion is provided on a portion of a surface of the probe.

Further, in order to solve the foregoing object, there is provided an electronic clinical thermometer having the above-described temperature measuring probe removably attached thereto.

Basically, therefore, the temperature measuring probe of the present invention possesses a structure in which a temperature measuring circuit is supported by a flat, flexible, strip-shaped base member and is sealed by a coating material, such as a film, and/or a filler. This makes it possible to form the overall probe into a film-shaped member (having a thickness of 0.05-0.2 mm), a sheet-shaped member (having a thickness of 0.2-1.0 mm) or a plate-shaped member (having a thickness of 1.0-4.0 mm). As a result, thermal capacity at the periphery of the temperature sensing body is reduced and, at the same time, the thermal resistance to the exposed portion at the time temperature is sensed is enlarged, thereby making it possible to shorten temperature sensing time. Furthermore, since the probe is made of a flexible material and is flat in shape, flexibility is maintained in a direction perpendicular to the surface whose temperature is measured (i.e., in the direction of the surface on which the probe is used) while there is almost no flexibility in a direction parallel to the surface (i.e., in the direction laterally of the surface). When temperature is measured, therefore, the flat probe assumes an attitude inserted in or affixed to the body part measured, at which time the rigidity in the lateral direction and the flexibility in the direction of the surface on which the probe is used assure that the probe can be inserted or affixed with ease and that the probe will be stably maintained after being set in place.

Preferably, the temperature sensing circuit is composed of the minimum number of required circuit elements For example, the probe is provided with interchangeability by such processing as trimming of the temperature sensing body and/or the precision compensating resistor and/or the linearizing resistor or selection of the precision compensating resistor and/or the linearizing resistor. The probe can thus be made disposable.

Preferably, the temperature sensing body is sealed in a filler having excellent thermal conductivity and is exposed from the coating member to improve the thermal response of the temperature sensing portion.

Preferably, a core member is stacked between the base member and the coating member. Flexibility and rigidity are freely selected by selecting the thickness, material and cross-sectional shape of the core member.

Preferably, the core member has approximately the same thickness as those of the circuit elements of the temperature measuring circuit, and portions of the core member corresponding to the circuit elements are formed into cavities to protect the circuit elements. The probe coating of film or the like is formed to have overall smoothness.

Preferably, the core member is provided with one or more polygonal or circular cavities at portions other than those corresponding to the circuit elements. This reduces the amount of heat that escapes from the temperature sensing portion via the core member. Thermal response is improved.

Preferably, the core member is provided only at a peripheral portion of the temperature sensing body and has a smoothly diminishing thickness. This protects the temperature sensing body and smoothens the coating, made of film or the like, of this portion.

Preferably, at least the cavity which receives the temperature sensing body is filled with a filler having excellent thermal conductivity, thereby improving the thermal characteristics of the temperature sensing body. This also protects the temperature sensing body against the penetration of chemicals, saliva and the like.

Preferably, an adhesive portion is provided on a portion of the surface to stabilize and retain the probe after it is affixed.

The electronic clinical thermometer of the invention has the above-described temperature measuring probe removably attached thereto. By arranging it so that signal processing is performed through an appropriate method, the probe can be made disposable.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENT

First Embodiment

A first embodiment of the invention relates to a temperature measuring probe in which the circuit elements possess thickness.

Figure 1:
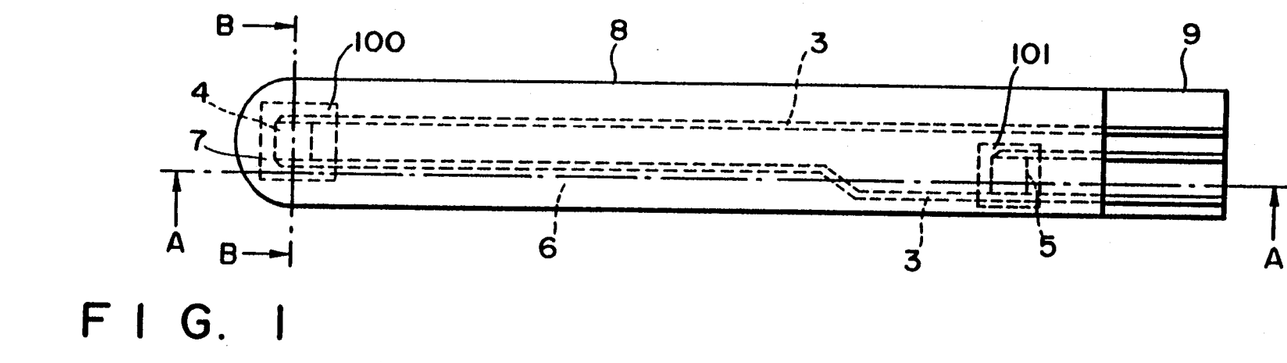
FIG. 1 is a front view illustrating a first embodiment of a temperature measuring probe according to the invention.
Figures 2, 3:
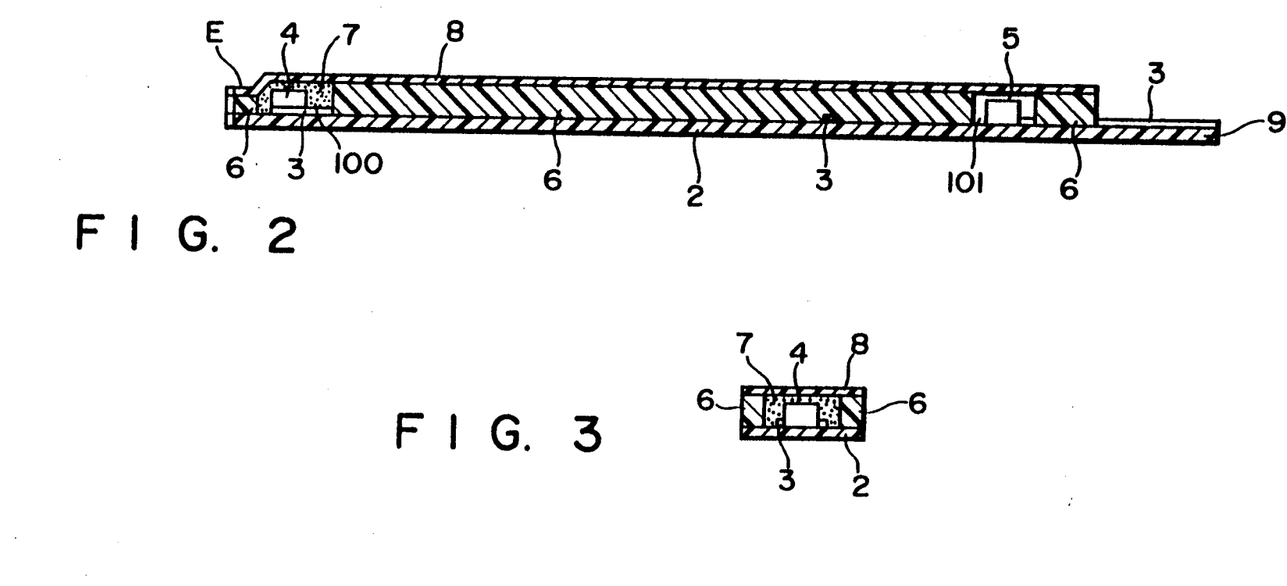
FIG. 2 is a sectional view taken along line A—A of FIG. 1.
FIG. 3 is a sectional view taken along line B—B of FIG. 1.

FIG. 1 is a front view illustrating the first embodiment of the temperature measuring probe according to the invention, FIG. 2 is a sectional view taken along line A—A of FIG. 1, and FIG. 3 is a sectional view taken along line B—B of FIG. 1. As shown in FIGS. 1 through 3, a temperature measuring circuit is mounted on a base member 2 and comprises a thermister 4 serving as a temperature sensing body, a precision compensating resistor or linearizing resistor 5, and a conductor 3 for leading electric signals from these elements to the outside of the probe. Stacked on the base member 2 is a core member 6 having cavities 100, 101 corresponding to the thermister 4 and resistor 5, respectively. At least the cavity 100 is filled with a filler 7 having a high thermal conductivity. The top of this arrangement is coated with a coating 8 such as film. In order to provide electrical connection to the main body of an electronic clinical thermometer, the terminus of the conductor 3 is not covered by the core 6 or film 8 but is left exposed to form a connector portion 9.

Employed as the base member 2 is polyimide, polyester or the like exhibiting heat resistance to soft solder. An example of the core material 6 is polyethylene or the like that has been subjected to a surface treatment. An example of the film 8 is polyester or the like. The core material 6 has a thickness approximately the same as that of the thermister 4 or resistor 5, serves to protect these circuit elements and is such that the coating provided by the film 8 can be performed easily and smoothly. The thickness, shape and material of the core 6 can be freely selected so that the probe can be provided with the proper rigidity. Alternatively, the core material 6 at the probe end E can be thinned somewhat to make it easier for this probe end to be inserted in a body cavity, such as the mouth, where temperature is to be measured.

The base member 2, core material 6 and film 8 are electrical insulators for the purpose of protecting the temperature sensing body, conductor and the like, and i these are required to exhibit some water resistance and resistance to chemicals (disinfectants).

An example of the filler 7 is an epoxy adhesive or the like.

Overall, the probe has a flat, strip-shaped configuration and can be formed into a sheet (having a thickness of 0.2-1.0 mm) or a plate (having a thickness of 1.0-4.0 mm). As a result, thermal capacity at the periphery of the temperature sensing body is reduced and, at the same time, the thermal resistance to the exposed portion at the time temperature is sensed is enlarged, thereby making it possible to shorten temperature sensing time. Furthermore, since the probe is made of a flexible material and is flat in shape, there is flexibility in a direction perpendicular to the surface whose temperature is measured (i.e., in the direction of the surface on which the probe is used) while there is almost no flexibility in a direction parallel to the surface (i.e., in the direction laterally of the surface). When the temperature of the mouth is measured, therefore, the flat probe assumes an attitude inserted under the tongue, at which time the rigidity in the side-face direction makes it difficult for warping to occur while the flexibility in the direction of the surface used makes it possible to insert the probe where desired. After the probe is inserted, the flexibility in the direction of the surface used can be utilized to allow the probe to bend so that it will not become an obstruction.

It should be noted that the base member 2 and conductor 3 can be replaced by a flexible substrate, in which case the base member 2 would comprise a thermoplastic resin exhibiting thermal resistance at the melting point of soft solder, an example being polyimide or polyester. The materials constituting core 6 and film 8 are chosen upon taking into consideration such factors as their adhesion, weldability and fusibility.

The resistor 5 and cavity 101 can be eliminated if use is made of a thermister 4 precision-compensated as by trimming.

Second Embodiment

The second embodiment of the invention relates to a temperature measuring probe in which the amount of heat that escapes via the core material is reduced.

Figure 4:
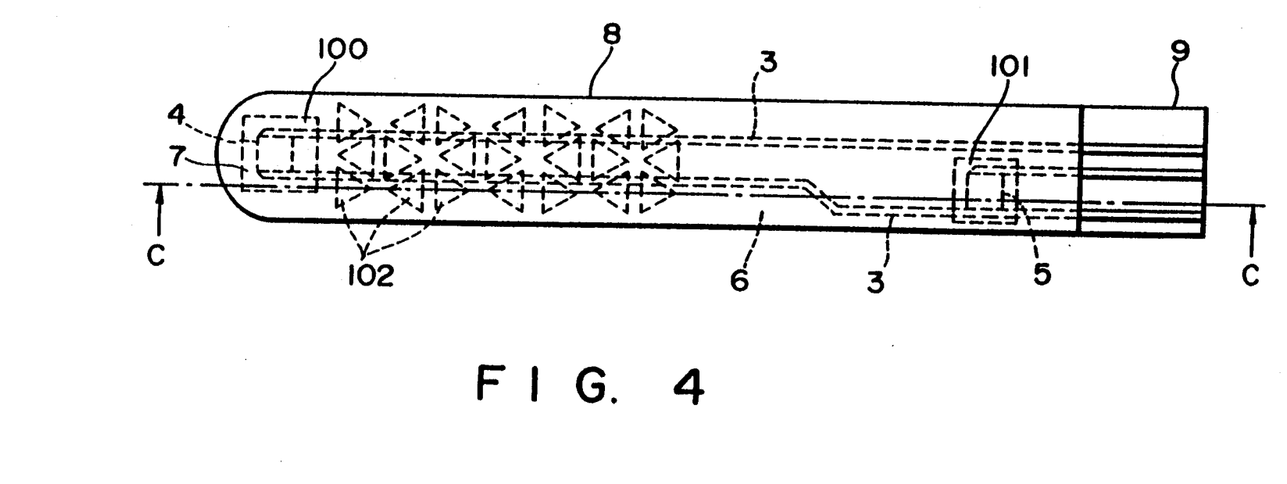
FIG. 4 is a front view illustrating a second embodiment of a temperature measuring probe according to the invention.
Figure 5:
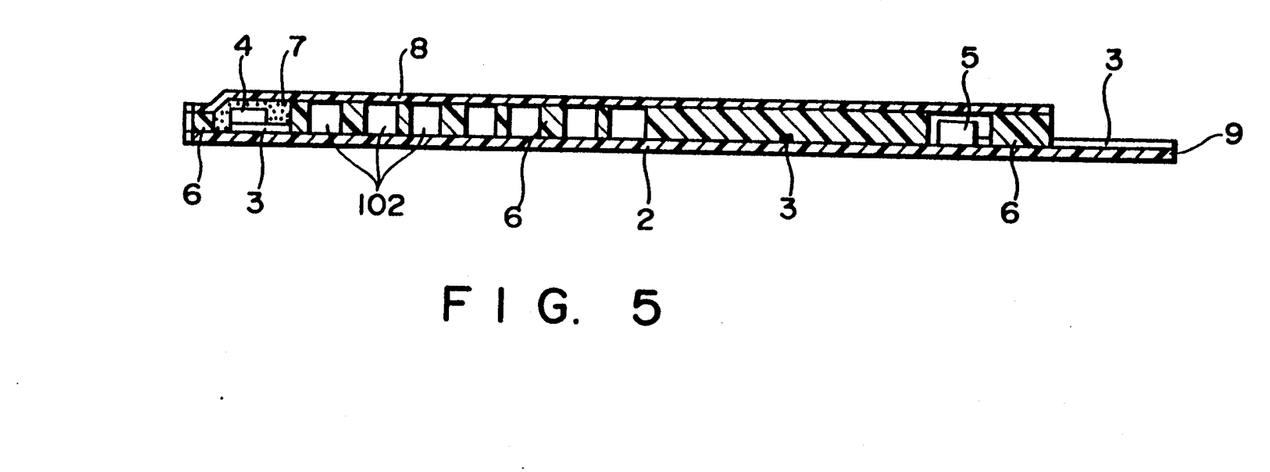
FIG. 5 is a sectional view taken along line C—C of FIG. 4.

FIG. 4 is a front view illustrating a second embodiment of a temperature measuring probe according to the present invention, and FIG. 5 is a sectional view taken along line C—C thereof. In FIGS. 4 and 5, if the core material 6 is provided with more than a certain degree of thickness, the majority of the heat at the periphery of the thermister 4 will be transmitted rearwardly of the probe via the core material 6 when temperature is sensed, and the heat will escape to the outside from the exposed portion. Accordingly, in the second embodiment of the invention, triangular cavities 102 are provided at a number of locations so as to reduce the escape of heat longitudinally of the probe via the core 6. The cavities 102 can be circular or polygonal if desired, and one or a plurality can be provided. If the core is sufficiently thin, there will be little escape of heat to the exposed portion, in which case the core need not be provided with holes.

Third Embodiment

The third embodiment of the invention relates to a temperature measuring probe in which only the temperature sensing body has thickness.

Figure 6:
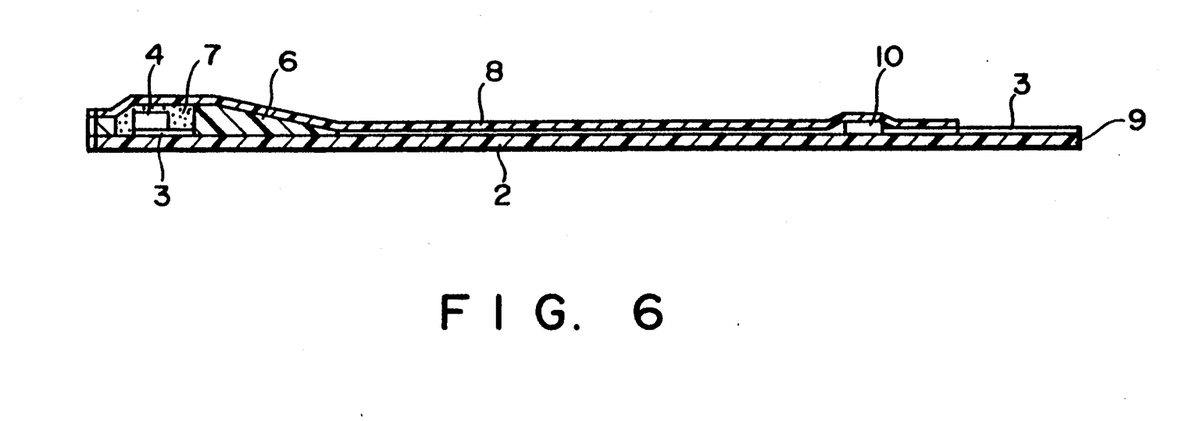
FIG. 6 is a sectional view illustrating a third embodiment of a temperature measuring probe according to the invention.
Figure 7:
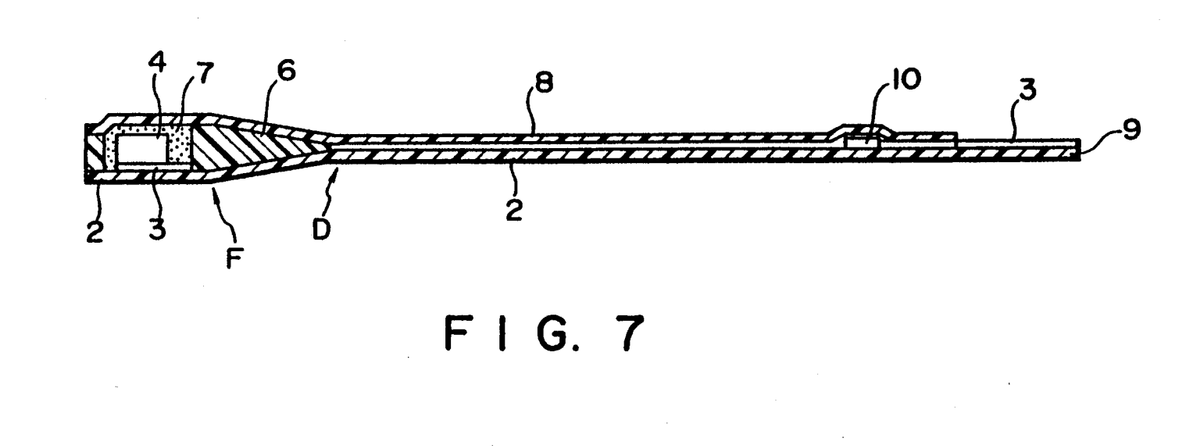
FIG. 7 is a sectional view illustrating a modification of the third embodiment.

FIG. 6 is a sectional view illustrating a third embodiment of a temperature measuring probe according to the present invention, and FIG. 7 is a sectional view showing a modification of the third embodiment. In FIGS. 6 and 7, if a thin-film resistor 10 is employed as the precision compensating resistor or the linearizing resistor, it is not always necessary to adopt a laminated structure in which the core 6 is interposed between layers. As a result, in the third embodiment, the core 6 is provided solely at the peripheral portion of the thick thermister 4, the core 6 has a thickness approximately the same as that of the thermister 4 at the portion near the thermister 4. The thickness of the core 6 diminishes from this portion toward the rearward end of the probe. The core 6 is thus tapered in such a manner that it will not cause discomfort at the body part measured while also allowing the film 8 to smoothly and uniformly coat the peripheral portion of the thermister 4. Since the thin-film resistor 10 has almost no thickness, it is held in direct, intimate coating contact with the base member 2 by the film 8. Thus, since the probe of the third embodiment has thickness solely at its temperature sensing portion, the user can readily ascertain the location of the temperature sensing portion and perform measurement with ease.

Rather than providing projections solely on one surface of the probe, a tapered structure can be adopted in which the base member 2 is bent at portions D and F.

The resistor 10 can be dispensed with if the thermister 4 is precision-compensated as by trimming.

Figure 18:
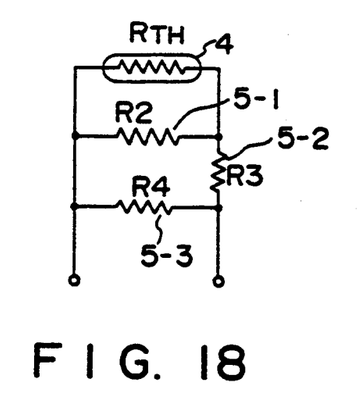
FIG. 18 is a circuit diagram showing a temperature measuring circuit for a case where measurement performed by an electronic clinical thermometer is of the constant-current type.

There is also a case in which there are a plurality of the precision compensating resistors 10 rather than just one (FIG. 18). However, if it is so arranged that the resistors 10 are obtained as by vapor deposition, the number of parts and the mounting process will be no different from when there is only one resistor. Only a process such as trimming for adjusting the precision compensating resistors 10 will be different. If the manufacturing cost per probe can thus be held down, the measuring system of the main body of the electronic clinical thermometer can be diversified, as by being made an oscillatory system or direct-current system, so that the measuring system can be provided with flexibility.

Fourth Embodiment

The fourth embodiment relates to several other embodiments concerned with the B—B cross section of the probe of the first embodiment.

Figure 8:
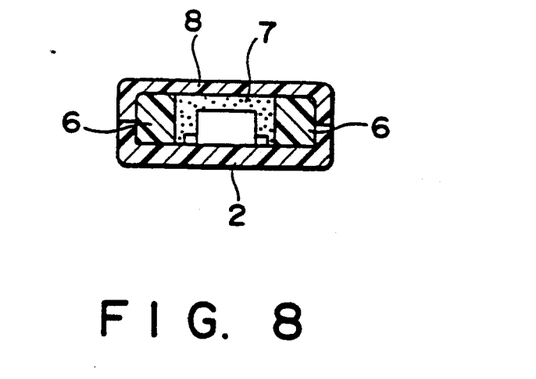
FIGS. 8 through 10 are sectional views of other embodiment relating to the B—B cross-sectional configuration of FIG. 3.
Figure 9:
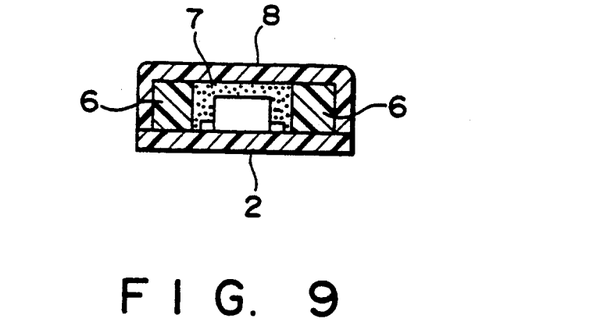
Figure 10:
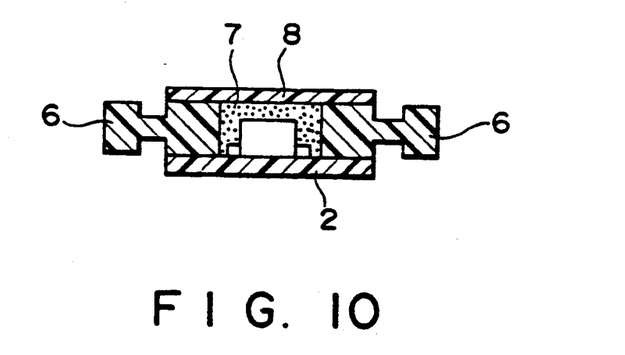

FIGS. 8 through 10 are sectional views of other embodiments relating to the B—B cross of FIG. 3. The configurations of the base member 2 and film 8 may be as shown in FIG. 8 or 9. In comparison with the arrangement of FIG. 3, here the film 8 is bonded, welded or fused directly to the base 2, and the surface of adhesion to the core 6 is greater in area. The probe therefore has an improved seal. The cross section of the probe need not always be rectangular. For example, if the cross section of the core 6 is of the type shown in FIG. 10, the secondary moment of the cross section can be enlarged.

Fifth Embodiment

The fifth embodiment relates to a probe in which the temperature sensing body is exposed from the coating by being sealed using a filler exhibiting high thermal conductivity.

Figure 11:
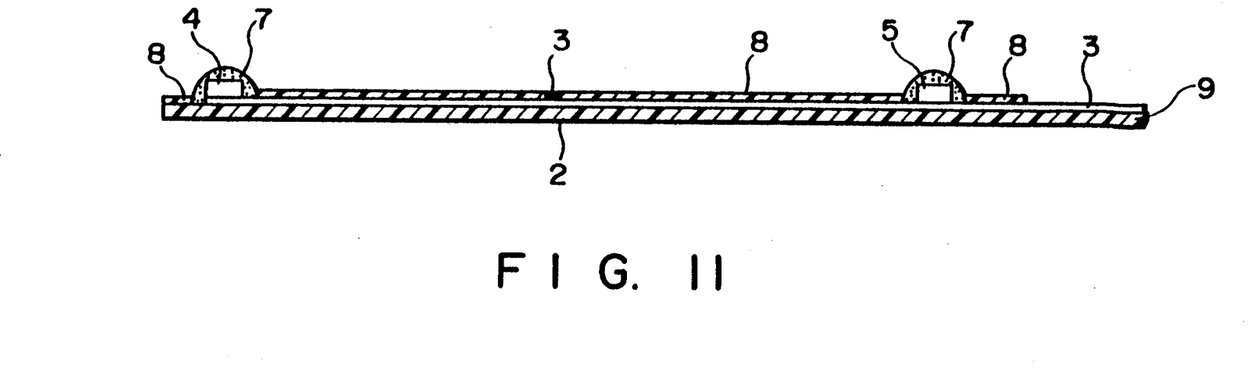
FIG. 11 is a sectional view illustrating a fifth embodiment of a temperature measuring probe according to the invention.

FIG. 11 is a cross sectional view of a fifth embodiment of the temperature measuring probe according to the present invention. Though the thermister 4 and the precision compensating resistor and/or linearizing resistor 5 have thickness, these are each coated by the filler 7 and are sealed and protected thereby. Other portions are coated with the film 8. Adopting this arrangement improves the thermal response of the thermister 4.

It should be noted that the core 6 may or may not be provided.

In addition, the same structure can be obtained even if the temperature sensing body 4 and/or resistor 5 do not have thickness.

Sixth Embodiment

The sixth embodiment relates to a temperature measuring probe in which the temperature sensing body does not possess thickness.

Figure 12:
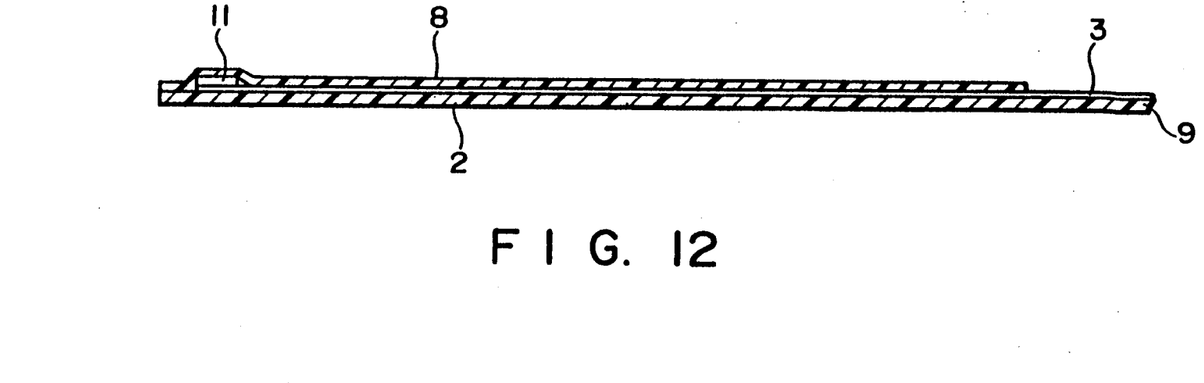
FIG. 12 is a sectional view illustrating a sixth embodiment of a temperature measuring probe according to the invention.

FIG. 12 is a sectional view showing a sixth embodiment of a temperature measuring probe according to the present invention. By way of example, here the temperature sensing body itself is made of a thin-film temperature sensing body 11 consisting of platinum or the like, and the body 11 per se is precision-compensated as by trimming. If this arrangement is adopted, it will be unnecessary to provide precision compensating resistors, thereby allowing the number of parts to be reduced. As a result, the structure of the probe according to the sixth embodiment is such that the entirety of the base 2, with the exception of the connector portion 9, is directly coated with the film 8 without the intervention of the core 6. This facilitates coating. In addition, the probe with this structure is such that thickness and rigidity are decided by the base 2. The probe can be formed into a film (having a thickness of 0.05-0.2 mm), a sheet (having a thickness of 0.2-1.0 mm) or a plate (having a thickness of 1.0-4.0 mm).

Seventh Embodiment

A seventh embodiment relates to a temperature measuring probe having an adhesive portion provided on a part of the probe surface.

Figure 13:
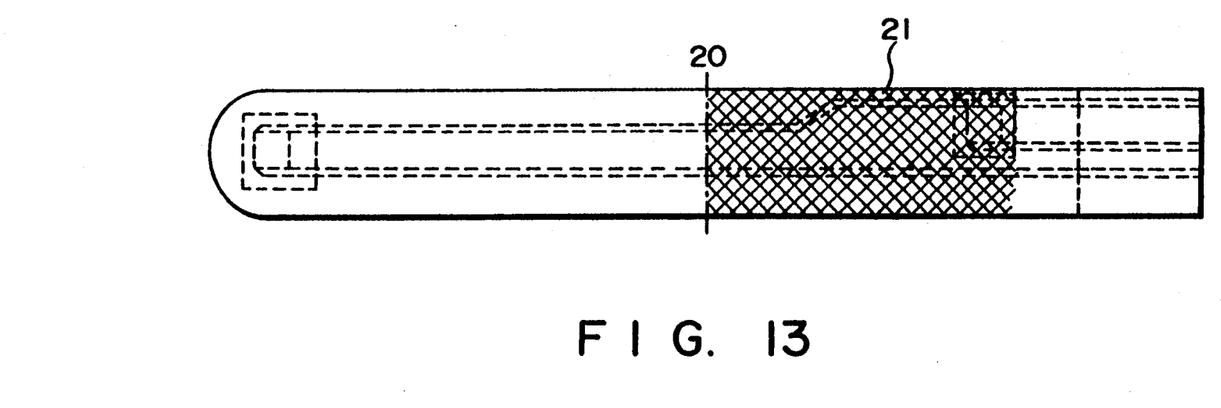
FIGS. 13 and 14 are back views illustrating a seventh embodiment of a temperature measuring probe according to the invention.
Figure 14:
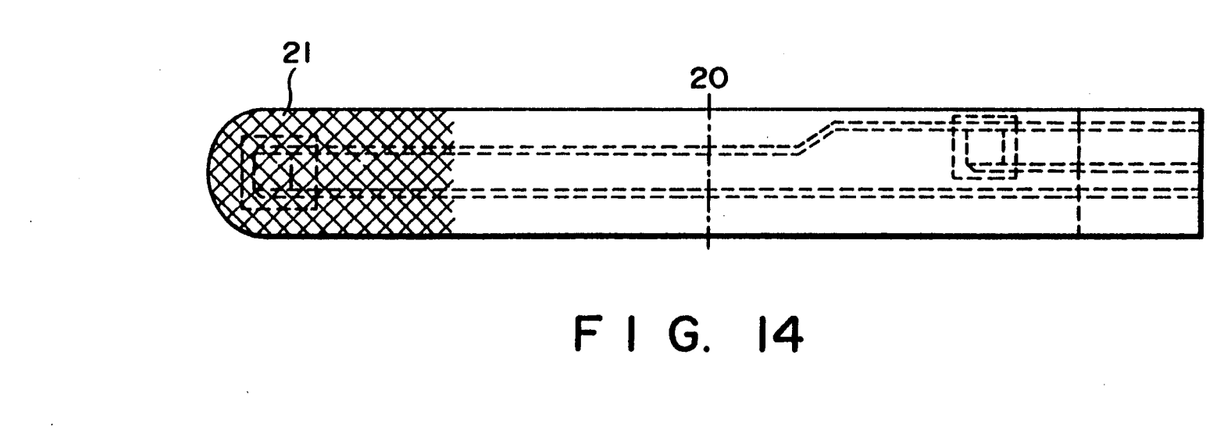

FIGS. 13 and 14 are back views illustrating a seventh embodiment of a temperature measuring probe according to the invention. Here the illustrated temperature measuring probe itself employs the arrangement of the first embodiment. The same is true of the other embodiments of the probes to follow. By applying an adhesive to a suitable portion of the back surface (or front surface) of the probe, this portion can be affixed to a surface of the human body. Accordingly, a connector and cord for providing the electrical connection to the main body can be fixed and supported and will not impede the sensing of temperature.

In the case of FIG. 13, an adhesive portion 21 is provided on all or part of the portion of the probe back surface extending longitudinally from the center line 20 of the probe as seen from the temperature sensing body. By virtue of this arrangement, the probe can be conveniently fixed to and supported on a body surface when temperature is sensed orally.

In the case of FIG. 14, the adhesive portion 21 is provided on all or part of the portion of the probe back surface at the distal end of the probe remote from the center line 20 in the longitudinal direction. This portion of the probe includes the vicinity of the temperature sensing body. This arrangement is advantageous in that the temperature sensing portion will not shift when temperature is sensed in an armpit.

Figure 15:
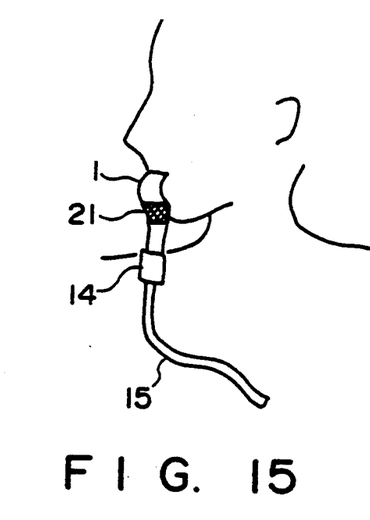
FIG. 15 is a view showing a case where the probe of FIG. 13 is used for oral temperature measurement.

FIG. 15 is a view for a case where the probe of FIG. 13 is used to measure temperature orally. The temperature sensing portion at the tip of the probe is placed under the tongue, after which the main body of the probe is bent toward the chin and affixed thereto by the adhesive portion 21 at the back surface of the probe. This arrangement allows a connector 14 and cable 15 to also be restrained and secured below the probe so as not to interfere with measurement.

Figure 16A:
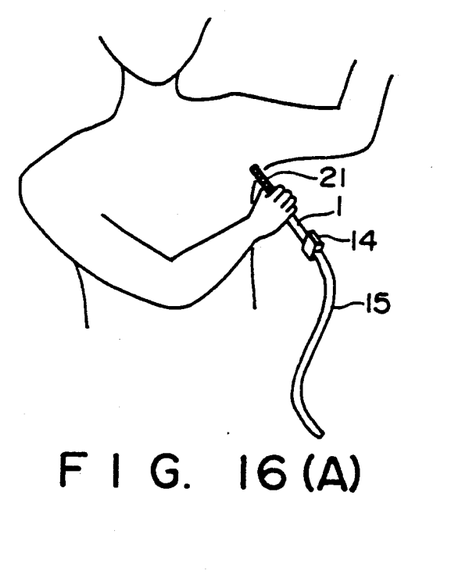
FIGS. 16(A), (B) are views showing a case where the probe of FIG. 14 is used for armpit temperature measurement.
Figure 16B:
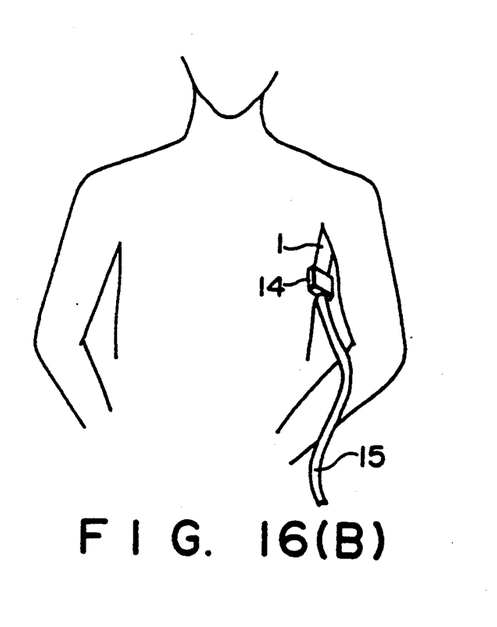

FIGS. 16(A), (B) are views for a case where the probe of FIG. 14 is used to measure temperature in an armpit. FIG. 16(A) shows how the back surface of the temperature sensing portion at the probe tip is affixed in the armpit, and FIG. 16(B) shows the probe in a state held lightly in the armpit after the probe is affixed. This assures that the temperature sensing portion will not shift during temperature measurement.

Temperature Measuring Circuit

In order for a probe to be disposable, probe interchangeability is required. In order to maintain this interchangeability, precision compensation of the temperature sensing body must be performed for each probe. To this end, two methods are available. In one method, an inexpensive temperature sensing body and one or more precision compensating resistors are mounted on the probe and the precision compensating resistors are adjusted. In the other method, only an expensive temperature sensing body having high precision is mounted on the probe.

Figure 17:
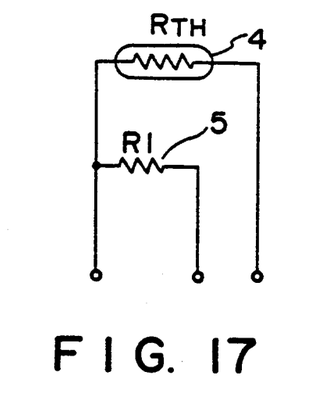
FIG. 17 is a circuit diagram showing a temperature measuring circuit for a case where measurement performed by an electronic clinical thermometer is of the oscillatory type.

FIG. 17 is a circuit diagram illustrating a temperature measuring circuit in a case where an electronic clinical thermometer performs measurement using an oscillatory method. According to the so-called oscillatory method, a circuit having a reference resistor $R_1$ (=the precision compensating resistor 5), the value whereof does not change with temperature, and a circuit having the thermister 4 are alternatingly connected and disconnected, an oscillator is caused to oscillate in the main body, the oscillations are counted and temperature is calculated based on the value of the count. Accordingly, the resistance value of the reference resistor $R_1$ is tuned in advance to the resistance value $R_o$ of the thermister 4 at a predetermined temperature $T_o$ as by trimming.

FIG. 18 is a circuit diagram illustrating a temperature measuring circuit for a case where an electronic clinical thermometer performs temperature measurement by a constant-current method. Here the resistance values $R_2$, $R_3$, $R_4$ of a plurality of precision compensating resistors 5-1, 5-2, 5-3 are each adjusted beforehand by trimming or the like.

If the temperature sensing body itself is precision compensated, the precision compensating resistors will no longer be necessary.

Electronic Clinical Thermometer

Figure 19:
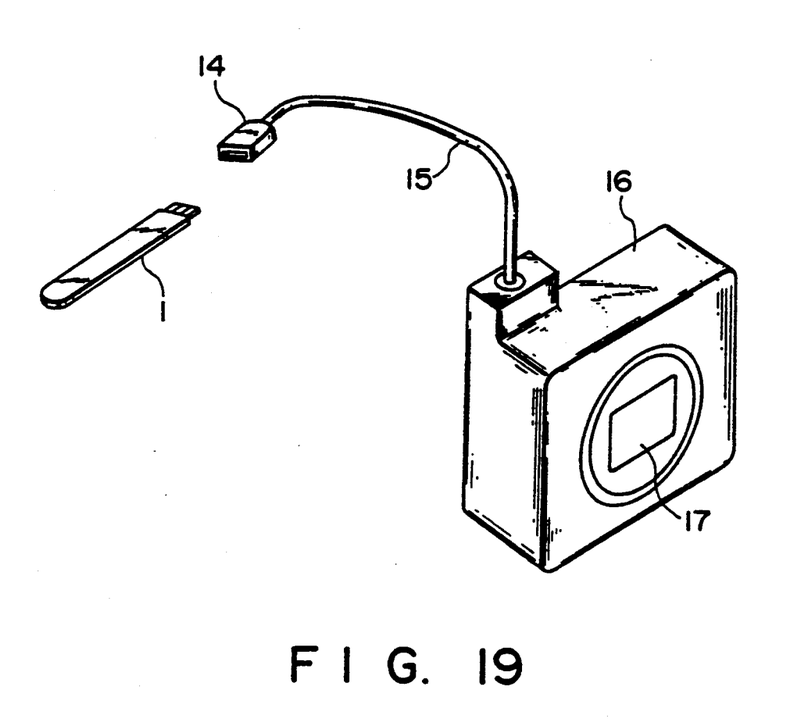
FIG. 19 is an external perspective view showing an embodiment of an electronic clinical thermometer of the oscillatory type.

FIG. 19 is an external perspective view illustrating an embodiment of an electronic clinical thermometer of the oscillatory type. Numeral 16 denotes the main body of the electronic clinical thermometer, and numeral 17 denotes a liquid-crystal display which displays measured body temperature. Numeral 15 designates a probe cable capable of being freely withdrawn from the interior of the main body 16. A connector 14 is provided at the end of the cable 15. Numeral 1 denotes the temperature measuring probe of the foregoing embodiments.

Figure 20:
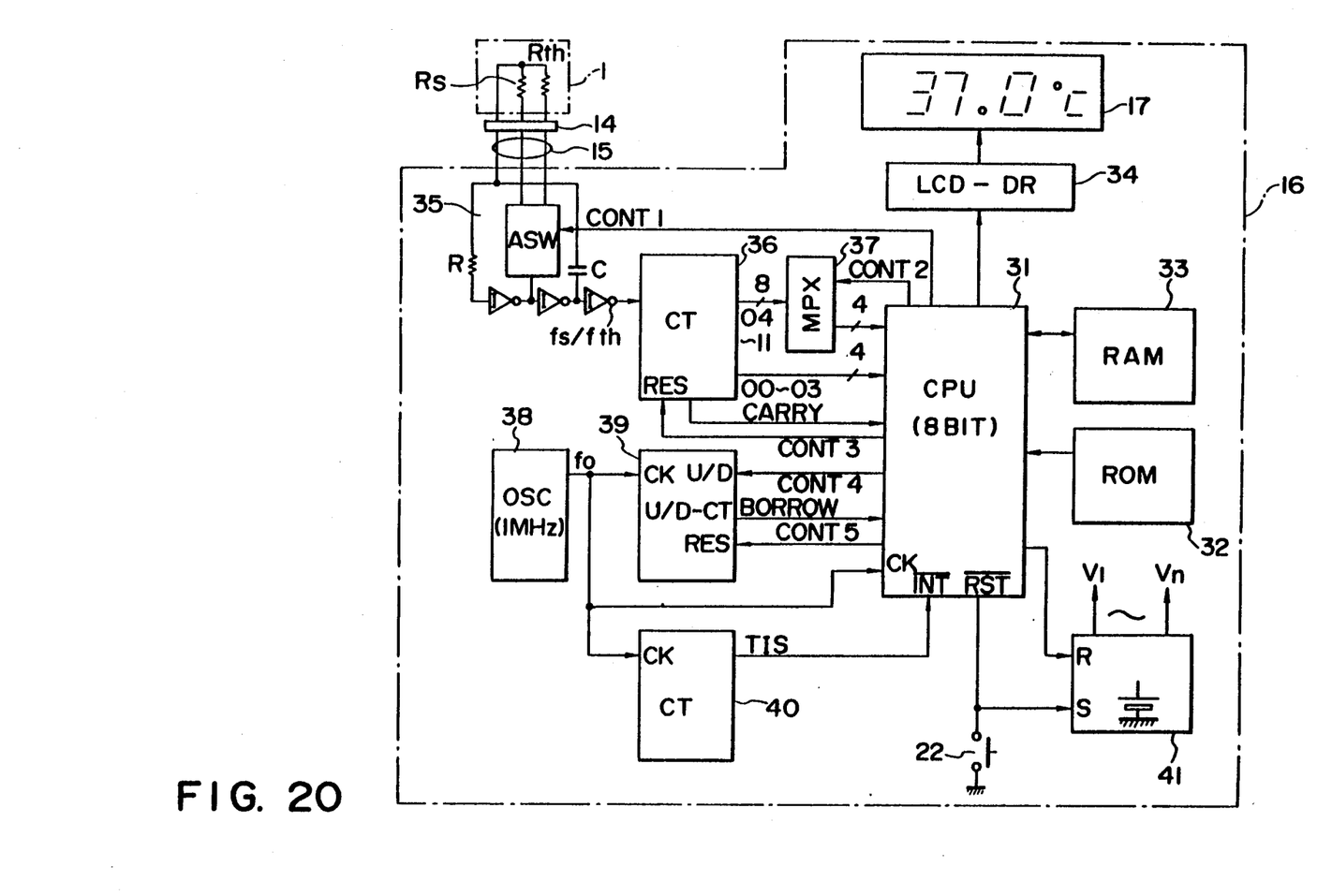
FIG. 20 is a block diagram illustrating an embodiment of an electronic clinical thermometer according to the invention.

FIG. 20 is a block diagram showing the construction of an embodiment of an electronic clinical thermometer according to the present invention. In FIG. 20, the probe 1 includes a thermister $R_{th}$ and a precision compensating resistor (reference resistor) $R_s$ which has been subjected to trimming or the like. The temperature measuring circuit comprising these resistors $R_{th}$, $R_s$ is connected to an oscillator circuit 35 of the main body 16 via the connector 9 of the probe 1, the connector 14 of the cable 15 and the cable 15. The oscillator circuit 35 comprises a C-MOS inverter I, a capacitor C, an analog switch (ASW) for switchingly connecting the resistor $R_s$ or $R_{th}$ to the oscillator circuit in response to a control signal from a CPU, and a resistor R which protects the C-MOS inverter I. The oscillator circuit 35 constitutes a portion of an A/D converter circuit. More specifically, the A/D converter circuit comprises a reference clock oscillator (OSC) 38 which oscillates at a fixed frequency $f_o$ (e.g., 1 MHz), a counter (CT) 36 for counting a predetermined number $N_1$ of pulses in a pulse train $f_s$ generated when the resistor $R_s$ is connected to the oscillator circuit 35, and an up-down counter (U/D-CT) 39 for counting up the pulses in a reference pulse train $f_o$ generated by the reference clock oscillator 38 for a time period T during which the CT 36 counts the predetermined number $N_1$, and for counting down the same reference pulse train $f_o$ until the value of the count reaches "0". The CT 36 counts the pulses in a pulse train $f_{th}$, generated when the resistor $R_{th}$ is connected to the oscillator circuit 35, for a period of time (equal to T) during which the U/D-CT 39 is counting down to "0". The A/D converter circuit is controlled by a CPU 31. The latter executes temperature measurement control periodically in response to a timer-interrupt signal TIS having a period of, e.g., 1 sec, which is the result of frequency-dividing the reference pulse train $f_o$ by a counter (CT) 40. In other words, the CPU 31 executes temperature measurement processing (not shown) the program for which is stored in a ROM 32. A RAM 33 temporarily stores the temperature data as well as other data necessary for measurement processing. The ROM 32 stores a correlation table, which is created by using a reference thermister, containing detected temperature values and digital display values having a predetermined relationship with respect to the detected temperature values. Numeral 34 denotes a driver circuit (LCD-DR) for driving the liquid-crystal display device (LCD) 17. Numeral 41 denotes a battery circuit which starts supplying power in response to depression of a power supply switch 22, and which stops supplying power in response to a signal from the CPU 31.

The principle of operation of an electronic clinical thermometer having a disposable probe will now be described in accordance with the arrangement of FIG. 20.

When the analog switch ASW is switched over to the $R_s$ side, the oscillation frequency $f_s$ is given by the following equation, in which k is a proportional constant:

$$f_s = 1/kCR_s \quad (1)$$

The oscillation frequency $f_s$ does not vary with a change in temperature. When the analog switch ASW is switched over to the $R_{th}$ side, the oscillation frequency $f_{th}$ is given by the following equation:

$$f_{th} = 1/kCR_{th} \quad (2)$$

The temperature-resistance characteristic of the resistor $R_{th}$ is given by the following equation:

$$R_{th} = R_o \exp[B(1/T_t - 1/T_o)] \quad (3)$$

$R_o$: thermister resistance value at reference temperature $T_o$
$R_{th}$: thermister resistance value at certain temperature $T_t$
B: B-constant of thermister Accordingly, when $R_{th}$ is connected, the oscillation frequency $f_{th}$ varies depending upon a change in temperature. If the pulse train $f_{th}$ is counted for a gate time period $T_c$ controlled to be a constant value, then the counted value $N_{th}$ wall vary in accordance with the following equation:

$$N_{th} = T_c/kCR_{th} \quad (4)$$

If the counted value $N_o$ at the reference temperature $T_o$ is assumed to be $$N_o = T_c/kCR_o \quad (5)$$

then the counted value $N_{th}$ at a certain temperature $T_t$ will be given by the following equation:

$$N_{th} = N_o \exp[-B(1/T_t - 1/T_o)] \quad (6)$$

The electronic clinical thermometer performs temperature compensation based on the foregoing. Specifically, the gate time period $T_G$ required for the pulse train $f_s$, produced when the resistor $R_s$ is connected, to be counted up to a fixed count $N_1$ is obtained, then the pulse train $f_{th}$, which is produced when the resistor $R_{th}$ is connected, is counted for the same time period $T_G$, thereby obtaining a counted value $N_2$. The counted values $N_1$, $N_2$ and the gate time period $T_G$ are related as follows:

$$T_G = N_1/f_s = N_2/f_{th} \quad (7)$$

and the counted values $N_1$, $N_2$ are related as follows:

$$N_2 = (f_{th}/f_s)N_1 \quad (8)$$

Since the counted value $N_2$ is obtained by counting for the gate time period $T_G$ when the resistor $R_{th}$ has been connected, we have $$N_2 = T_G/kCR_{th} \quad (9)$$

A counted value $N_{20}$ at the reference temperature $T_o$ is given by the following equation:

$$N_{20} = T_G/kCR_o \quad (10)$$

Accordingly, the counted value $N_2$ has a value proportional to the two oscillation frequencies $f_s$, $f_{th}$ generated in the two counting operations, with the counted value $N_1$ being a predetermined number. Thus, the counted value $N_2$ is correct at all times and exhibits excellent reproducibility.

Accordingly, even if a gentle variation with the passage of time or a variation with temperature appears in the circuit characteristics with the exception of $R_s$ and $R_{th}$, a cancelling effect takes place with regard to the counted value $N_2$. This makes it possible to provide a highly precise, highly stable electronic clinical thermometer. If trimming or the like is carried out in such a manner that the value of $R_s$ becomes comparatively close to the resistance value $R_{tho}$ of the thermister $R_{th}$ at the time of the reference temperature $T_o$, then the counted value $N_{20}$ can be replaced by the counted value $N_1$ to simplify the apparatus. Accordingly, the electronic clinical thermometer of this embodiment is equipped with the resistor $R_{th}$ or $R_s$ trimmed for each replaceable probe. To this end, the thermometer is handled as one in which the counted value $N_{20}$ is replaced at all times by the counted value $N_1$ on the side of the thermometer main body 16, thus rendering the probe disposable.

In accordance with the present invention as described above, the probe has a flat configuration. As a result, thermal response is excellent and measurement time can be shortened.

In addition, since the probe is disposable, there is no risk of infection. This will increase the demand for such probes.

As many apparently widely different embodiments of the present invention can be made without departing from the spirit and scope thereof, it is to be understood that the invention is not limited to the specific embodiments thereof except as defined in the appended claims.

What is claimed is:

1. A temperature measuring probe comprising:
   a flat, flexible strip-shaped base member;
   a core member secured on said base member and including at least one cavity therein;
   a temperature measuring circuit including a temperature sensing body positioned within said at least one cavity of the core member, the thickness of said core member at a portion of said at least one cavity being approximately the same as that of said temperature sensing body, said core member having a smoothly diminishing thickness from said at least one cavity toward the rearward end of the probe;
   a conductor coupled to said temperature sensing body;
   a connector formed on one end of said base member; and
   a coating member on said core member for sealing the interior of said probe from the outside.

2. The temperature measuring probe according to claim 1, wherein said conductor is for leading an electric signal from said temperature sensing body to a main body for performing signal processing.

3. The temperature measuring probe according to claim 1, wherein said temperature measuring circuit includes a precision compensating resistor and a linearizing resistor for said temperature sensing body, and said conductor is for leading electric signals from these elements to a main body for performing signal processing.

4. The temperature measuring probe according to claim 2, wherein said temperature sensing body is one of a thermistor and a thin-film body made of platinum.

5. The temperature measuring probe according to claim 3, wherein said temperature sensing body is one of a thermistor and a thin-film body made of platinum.

6. The temperature measuring probe according to claim 1, further comprising a filler filling said at least one cavity which accommodates the temperature sensing body therein, said filler having excellent thermal conductivity.

* * * * *

UNITED STATES PATENT AND TRADEMARK OFFICE
CERTIFICATE OF CORRECTION

PATENT NO. : 5,149,200

DATED : September 22, 1992

INVENTOR(S) : SHIOKAWA et al

It is certified that error appears in the above-identified patent and that said Letters Patent is hereby corrected as shown below:

Column 6, line 56, after the words "is of the", insert --  --.

Column 8, line 7, change "Figs. 16(A),(B)" to read

--Figs. 16(A) and (B)--.

Signed and Sealed this

Twelfth Day of October, 1993

*Attest:*

BRUCE LEHMAN

*Attesting Officer*　　*Commissioner of Patents and Trademarks*